US012577905B2

(12) United States Patent
Santini et al.

(10) Patent No.: US 12,577,905 B2
(45) Date of Patent: Mar. 17, 2026

(54) GAS TURBINES IN MECHANICAL DRIVE APPLICATIONS AND OPERATING METHODS THEREOF

(71) Applicant: NUOVO PIGNONE TECNOLOGIE—SRL, Florence (IT)

(72) Inventors: Marco Santini, Florence (IT); Marco Scarponi, Florence (IT)

(73) Assignee: Nuovo Pignone Tecnologie—SRL, Florence (IT)

( * ) Notice: Subject to any disclaimer, the term of this patent is extended or adjusted under 35 U.S.C. 154(b) by 0 days.

(21) Appl. No.: 17/997,469

(22) PCT Filed: Apr. 23, 2021

(86) PCT No.: PCT/EP2021/025154
§ 371 (c)(1),
(2) Date: Oct. 28, 2022

(87) PCT Pub. No.: WO2021/223910
PCT Pub. Date: Nov. 11, 2021

(65) Prior Publication Data
US 2023/0167766 A1 Jun. 1, 2023

(30) Foreign Application Priority Data
May 4, 2020 (IT) ........................ 102020000009721

(51) Int. Cl.
*F02C 3/10* (2006.01)
*F02C 6/00* (2006.01)
*F02C 7/36* (2006.01)

(52) U.S. Cl.
CPC .................. *F02C 3/10* (2013.01); *F02C 6/00* (2013.01); *F02C 7/36* (2013.01); *F05D 2220/32* (2013.01); *F05D 2220/76* (2013.01); *F05D 2260/40* (2013.01)

(58) Field of Classification Search
CPC .... F02C 3/04; F02C 3/10; F02C 3/107; F02C 7/36; F05D 2220/76; F05D 2260/40
See application file for complete search history.

(56) References Cited

U.S. PATENT DOCUMENTS

| | | | | |
|---|---|---|---|---|
| 3,733,095 A | * | 5/1973 | Sinclair | ................... F03B 11/00 290/1 R |
| 3,943,374 A | * | 3/1976 | Clements | ................ F01D 5/026 415/910 |
| 4,630,436 A | | 12/1986 | Frutschi | |
| 8,113,005 B2 | | 2/2012 | Gotz et al. | |
| 2005/0003258 A1 | | 1/2005 | Sang et al. | |

(Continued)

FOREIGN PATENT DOCUMENTS

| | | |
|---|---|---|
| CN | 104956036 A | 9/2015 |
| CN | 105579690 A | 5/2016 |

(Continued)

*Primary Examiner* — Scott J Walthour
(74) *Attorney, Agent, or Firm* — Paul Frank + Collins P.C.

(57) ABSTRACT
A drive system for driving a load, such as a pump, a compressor or the like, is disclosed. The drive system comprises two clutches operable so that it is possible to exclude the load, so as to maximize the power transferred to the electric powered grid, when a peak of energy is required. Also disclosed is a method for operating a drive system for driving a load.

16 Claims, 1 Drawing Sheet

(56) References Cited

U.S. PATENT DOCUMENTS

| | | | | |
|---|---|---|---|---|
| 2009/0199567 A1* | 8/2009 | Gockel | .................... | F02C 7/32 |
| | | | | 60/788 |
| 2010/0264655 A1* | 10/2010 | Rosson | ................. | F02C 6/003 |
| | | | | 60/670 |
| 2013/0149102 A1 | 6/2013 | Marcucci et al. | | |
| 2016/0105078 A1* | 4/2016 | Santini | ................... | F16H 47/02 |
| | | | | 290/52 |
| 2018/0202368 A1 | 7/2018 | Suciu et al. | | |
| 2019/0376416 A1* | 12/2019 | Mastro | .................... | F02C 7/36 |
| 2020/0291817 A1* | 9/2020 | Leque | ................. | F01M 11/064 |

FOREIGN PATENT DOCUMENTS

| | | | |
|---|---|---|---|
| CN | 108180045 A | 6/2018 |
| EP | 2241725 A2 | 10/2010 |
| JP | 2017155665 A | 9/2017 |
| RU | 2448259 C2 | 4/2012 |
| RU | 2674107 C2 | 12/2018 |
| WO | 2007112726 A1 | 10/2007 |
| WO | 2014072433 A1 | 5/2014 |
| WO | 2017/067871 A1 | 4/2017 |

* cited by examiner

GAS TURBINES IN MECHANICAL DRIVE APPLICATIONS AND OPERATING METHODS THEREOF

TECHNICAL FIELD

The present disclosure concerns improvements to gas turbine systems used in mechanical drive applications capable of increasing the efficiency when a full power generation mode is required. In particular, but not exclusively, the disclosure concerns a hybrid gas turbine systems for driving loads, e.g., compressors for refrigerant fluids in liquefied natural gas facilities, compressors for compressing gas in pipeline transportation, a pump or any other rotary machine.

The disclosure further concerns improvements to the method for operating the gas turbine system.

Background Art

Liquefied Natural Gas (LNG) results from a liquefaction process, in which the natural gas is cooled using one or more refrigeration cycles in a cascade arrangement, until it becomes liquid. Natural gas is often liquefied for storage or transportation purposes, especially when pipeline transportation is not possible.

Cooling of the natural gas is performed using closed or opened refrigeration cycles. A refrigerant is processed in a compressor or compressors, condensed and expanded. The expanded, chilled refrigerant is used to remove heat from the natural gas flowing in a heat exchanger.

When it is possible, or economically feasible, a pipeline transportation is generally used for transporting gas. To maintain the gas under pressure in the pipeline, one or more compressors are arranged along the pipeline.

Refrigerant compressors in LNG, compressors for pipeline applications or other rotary equipment for applications in the oil and gas industry, are often driven by gas turbines. The gas turbine power availability is dependent upon ambient conditions, namely air temperature, as well as other specific factors. The turbine power availability is inversely proportional to the ambient temperatures. This causes power availability fluctuations, because of the daily or seasonal temperature fluctuations.

There are available in the market the so called hybrid gas turbines, where an electric machine, or more specifically an electric motor/generator is associated in combination with a gas turbine to drive a load, such as one or more compressors or pumps. The electric motor/generator has been initially used to supplement mechanical power to the load, to maintain the overall mechanical power on the load shaft constant, when power availability of the turbine decreases, and/or to increase the total mechanical power used to drive the load. This function of the electric motor/generator is referred to as helper duty. Another electric motor or, alternatively a pneumatic motor/generator, is usually used also as a starter motor, to accelerate the gas turbine from zero to the rated speed.

Instead, when an excess mechanical power is generated by the turbine, e.g., if the ambient temperature drops below the design temperature and consequent increase in power availability of the turbine, or mechanical load required by the compressor drops, the excessive mechanical power generated by the gas turbine is converted into electric power, using the electric helper motor/generator as a generator.

Nowadays there is an increasing demand for systems capable of supplying power in case of necessity, for example in case of consumption peaks in the electric power grids.

To this end, the above mentioned system configurations, also called train configuration system, is employed. More specifically, the system comprises usually, as said, a gas turbine, the load, such as a compressor, a pump or the like, an electric motor/generator, connected to the load through a shaft, and a self-synchronizing clutch, interposed between the gas turbine and the load. Also, the electric motor/generator is connected to the electric power grid. Therefore, the electric motor/generator can operate as a motor, absorbing electric power from the electric power grid, so that it drives (or contributes to drive) the load, or as a generator, supplying excess electric power into the electric power grid.

The hybrid gas turbine systems can be operated in four modes: helper mode, generator mode, full electric mode, and full gas turbine mode (also referred to as full power generation mode).

In the helper mode both the gas turbine and the electric motor/generator supply to the load. In this case, the clutch is connected, the electric motor/generator absorbs energy from the electric power grid, operating as a motor, and the gas turbine supplies energy to the load as well. Therefore, the power received by the load is the sum of the power generated by the gas turbine and by the electric motor/generator.

In the generator mode, the clutch is connected, the gas turbine supplies energy to the load, and the electric motor/generator operates as a generator, thus feeding possible excess energy into the electric power grid. In such operating mode the power generated by the gas turbine is actually split, feeding the load and introducing energy in the electric power grid.

In the full electric mode, the clutch is disconnected, i.e., it is opened, so that the gas turbine, which can be even shut down, might thus not work at all, while the electric motor/generator drives the load, thus absorbing energy from the electric power grid, so that the electric motor/generator operates as a motor. In this configuration the clutch is used for transforming the train system in zero emission running.

Finally, in the full power generation mode, i.e., the fourth operation mode, the clutch is connected, the load, such as the compressor or the pump, absorbs the minimum torque, since the speed is kept at the minimum operating speed, the electric motor/generator operates as a generator, and the gas turbine generates the power. This operating mode is usually operated whenever there is a power absorption peak requested by the electric power grid, thus the power generated by the turbine has to be transformed in electric energy and injected in the electric power grid.

In this cases of high demand of power, supplying the maximum energy is required. Therefore, it is required to increase the power generated by the electric machine. Given that in this situation the resistant torque of the electric power grid is increased, owing to the high-energy demand, the gas turbine necessarily operates in full power-low speed mode. This implies that the number of rotation of the gas turbine per minutes is quite low. in particular, the following equation holds $$P_{Abs}{}^{EM} = c \cdot n$$

where $P_{Abs}{}^{EM}$ is the power absorbed by the electric motor, c is the resistant torque, and the n s the number of rotations of the electric motor/generator.

However, the load, such as the compressor or the pump, absorbs power from the gas turbine, which causes the reduction of the power absorbed by the electric motor/generator, while operating as a generator.

It is considered that in particular, for instance, a compressor (or even any mechanical load such as pump or the like) cannot rotate below a threshold of rotation number n, mainly for stability/operability reasons. Hence part of the power generated is inevitably lost.

The issue of the minimum operating speed, required for the correct operation of the loads is generally due to two main aspects. The first aspect has a fluid dynamic nature, while the other has a rotodynamic nature. As for the first aspect, it can be considered the surge or chocking for the compressor or the cavitation for the pumps. As regards the rotodynamic problem, in general below certain rotation thresholds there may be critical speeds for the compressor turbine shaft, which lead the shaft to substantially vibrate, causing various operating problems or even the shaft breaking.

In other words, the hybrid gas turbine systems according to the prior art according to the above described configuration, have a power loss during the full power generation mode, since the compressor/pump is always in turn mode and, even if it is in full recycle condition, the absorbed power (that is considered as a loss) is of the order of magnitude of several percent points (around 7-12%) of the power generated by the gas turbine.

Accordingly, an improved hybrid gas turbine system capable of maximizing the transmitted power to the load in case of necessity would be welcome in the field. More specifically, it would be welcome a train-system, comprising a hybrid gas turbine, having an increased efficiency when the full power generation mode is required.

SUMMARY

In one aspect, the subject matter disclosed herein is directed to a drive system for driving a load, such as a pump, a compressor or the like. The drive system comprises a gas turbine for generating power, and an electric motor/generator, such as a variable frequency drive electric motor (VFD electric motor), connectable to an electric power grid. The electric motor/generator is capable of operating as motor, absorbing power from electric power grid, and as generator, injecting power in the electric power grid.

The drive system comprises also a first self-synchronizing clutch or an over running clutch, connected between the gas turbine and the VFD electric motor, to disconnect the gas turbine, and a second self-synchronizing clutch or an over-running clutch, connected between the load and the VFD electric motor, to disconnect the load.

In another aspect, the subject matter disclosed herein concerns a drive system wherein the first and the second self-synchronizing clutches are operated manually by an operator or automatically by an actuator.

In another aspect, disclosed herein is a method for operating a drive system for driving a load, comprising the steps of: closing the first disconnecting device; opening the second disconnecting device; operating the electric motor/generator as a generator; so as to operate the drive system as full gas turbine mode, where the load is disconnected and the power generated by the gas turbine can be transferred to the electric power grid.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Sometimes there are consumption peaks, which cause stresses to the electric power grid. To supply extra energy, the gas turbines used for driving mechanical loads, as pumps or compressors, are used. The mechanical energy produced by the gas turbines are transformed in electric energy by an electric motor/generator device. To optimize the efficiency of the energy transfer from the gas turbine to the electric powered grid, a new layout along with the provision of disconnecting devices are used. In this way, it's possible to mechanically exclude the load and disengage it from the gas turbine, so that all the energy of the latter can be injected into the electric power grid by motor/generator device.

More specifically, according to one aspect, the present subject matter is directed to a hybrid gas turbine drive systems used in mechanical drive applications comprising a gas turbine and an electric motor/generator. The drive system is capable of operating in the usual modes, namely as helper mode, generator mode, full electric mode, and full power generation mode, so as to be flexible in any operations or necessity. The layout of the system is such that the load that the gas turbine is adapted to drive can be excluded from the power generation circuit when the system operates in full power generation mode, preventing the load to absorb part of the power generated by the gas turbine, thus maximizing the power transmitted to the load in case of necessity.

The load exclusion is achieved by means of disconnecting devices, which can be selectively opened or closed, depending on the necessity. This solution allows running with the gas turbine in full power generation mode, and disconnecting the mechanically driven equipment (the load). In this way, all the power of the gas turbine goes in electrical power. This is achieved preventing to keep always connected the mechanically driven equipment (such as a pump or the centrifugal compressor), and thus preventing the latter to absorb power also when the full power generation mode is required.

When a high demand of electric power is required, the disconnecting device (which is connected to the load) opens, so that the gas turbine and the electric motor/generator can generate and transfer the maximum power into the electric power grid, to supply energy and cope with the peak of energy requested.

Figure 1:
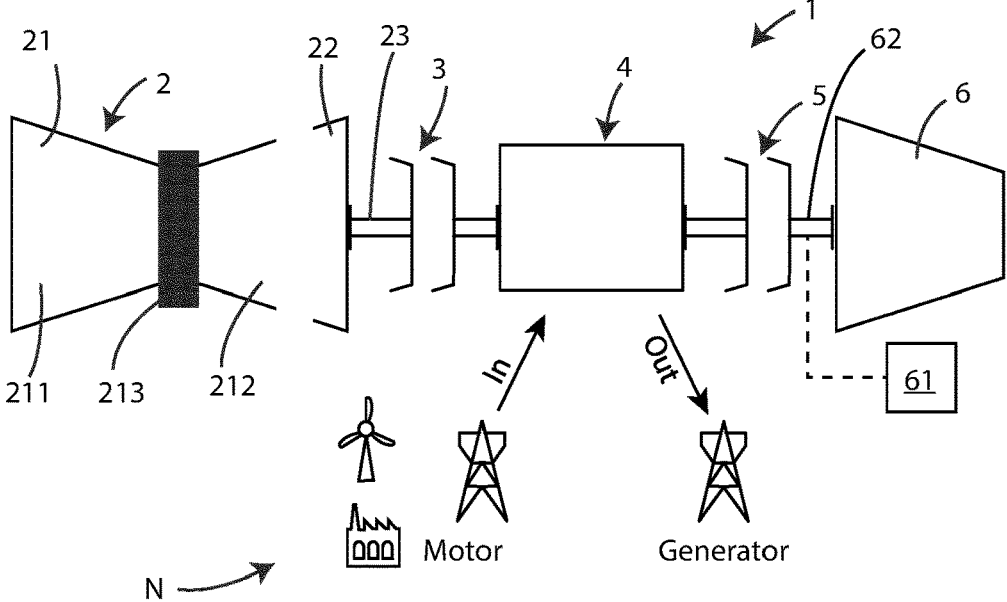
FIG. 1 illustrates a scheme of a drive system arrangement according to the present disclosure.

Referring now to the drawings, FIG. 1 illustrates an embodiment of the subject matter disclosed herein. A mechanical drive system 1 is in particularly illustrated, which comprises a gas turbine 2, a first disconnecting device 3, an electric motor/generator 4, a second disconnecting device 5, and a load 6.

The gas turbine 2, which is, for example, a heavy duty or aero derivative gas turbine, comprises a gas generator 21 and a power turbine or low-pressure turbine 22. The gas generator 21 comprises also a gas-generator compressor 211 and a high-pressure turbine 212. The gas-generator compressor 211 compresses air from the environment, which is delivered to a combustor 213. In the combustor 213 fuel is added to the air flow and a fuel/air mixture is formed and ignited.

The combustion gas generated in the combustor is delivered to the high-pressure turbine 212 and partly expands therein, generating mechanical power. The mechanical power generated by the high-pressure turbine 212 is used to drive the gas-generator compressor 213. The partly expanded combustion gas flows through the power turbine 22, where it further expands to generate additional mechanical power. The power turbine 22 comprises usually a power turbine rotor (not shown in the figure) on a power turbine shaft (not shown in the figure).

The gas turbine 2, or, more specifically, the power turbine 22, is connected through a coupling shaft 23 to the first disconnecting device 3, which is connected, in its turn, to the electric motor/generator 4.

The electric motor/generator 4 is a variable frequency drive electric motor (also known as VFD electric motor). This kind of electric motor/generator 4 is based on a technology that allows to accomplish a reduction of the emissions, a remarkable flexibility and operation reliability, as well as a reduced maintenance cost.

The VFD electric motor 4 is connected to the electric power grid N, in such a way that it can either inject power into the electric power grid N, thus operating like a generator, or being supplied by the electric power grid N, so that it operates as a motor. The use of a VFD electric motor 4 is convenient as it can follow the speed of the mechanical load, which, in order to satisfy the process, e.g. in the pipelines etc., needs to vary the number of its rotation, since the final pressure depends on the speed load, which, as said, can be for example a compressor or a pump.

The electric power grid N can be connected to renewable power production plants, like, for example, solar or wind energy generators plants.

In some embodiments, also other type of electric motor/generator, capable of operating either as generator, or as electric motor can be installed.

Still referring to FIG. 1, the second disconnecting device 5 is interposed between the VFD electric motor 4 and the load 6 connected to the drive system 1, and is operated for decoupling the entire power generation part of the system 1 from the load 6 for certain operating configurations, as better described below.

The first disconnecting device 3 is capable of reversibly disconnecting the torque transmitted to the load 6 from the gas turbine 2 through the VFD electric motor 4. Instead the second disconnecting device 5 is operated for reversibly disconnecting the VFD electric motor 4 from the load 6.

As an embodiment, the first disconnecting device 3 is arranged between the power turbine shaft 23 and the VFD electric motor 4. The disconnecting device 3 has two operating modes, namely a connecting operating mode, wherein the power (torque) from the gas turbine 2 is transmitted to the electric motor/generator 4, and a disconnecting operating mode, wherein the gas turbine 2 is disconnected from the VFD electric motor 4.

Likewise, the second disconnecting device 5, which, as said, is arranged between the VFD electric motor 4 and the load 6, has two operating modes, namely a connecting operating mode, wherein the power (torque) from the VFD electric motor 4 is transmitted to the load 6, and a disconnecting operating mode, wherein the power (torque) from the gas turbine 2 and the VFD electric motor 4 cannot be transmitted.

The first 3 and/or the second 5 disconnecting devices can be operated manually by an operator, or automatically by an actuator or with a self-synchronizing clutch. In the embodiment of FIG. 1 both the first 3 and the second 5 disconnecting devices are self-synchronizing clutches.

Also, in general the clutches, of self-synchronizing clutch or over running type, are equipped with devices known as lock in and lock out devices, which, when activated, have the function of locking the clutch in an engaged or disengaged position.

With particular reference to the second disconnecting device 5, it is usually a self-synchronizing clutch, owing to the fact that it is mainly used in the technical field at issue. For this specific kind of clutches, the disengagement between the electric motor/generator 4, namely the VFD electric motor, and the load 6, may be realized by two operating modes. Preliminarily, it has to be considered that the engagement between the two parts of the clutch is realized by properly shaped toothed gears, which can be connected by a hooking connection mechanism. Therefore, before disengaging a self-synchronizing clutch, a safe disconnection between the mechanical parts have to be carried out. A first disengagement mode provides that the VFD electric motor 4 is operated in order to counter rotate for typically a half/one entire turn one of the parts of the clutch with respect to the other, so as to ensure the mechanical disengagement of the above-mentioned mechanical parts. This function of counter-rotation can be obtained by energizing the electrical machine for this specific function.

As an alternative, the load 6 can be equipped with a turning gear device 61 operable for counter-rotating the drive shaft 62 of the load 6, to disengage the second disconnecting device 5.

Also, the first 3 and/or the second 5 disconnecting devices can be automatically operated by an operator or by an electronic controller programmed to disconnect/connect the gas turbine 2 from/to the electric motor/generator 4 and the load 6 under certain conditions. In other embodiments, as mentioned above, the actuator for controlling the first 3 and second 5 disconnecting devices can be manually operated by the operator.

As an alternative to the electrically actuated clutches, hydraulic clutches can be installed, although there might be mechanical losses.

In other embodiments, the disconnecting devices 3 and 5 can comprise a hydraulic torque converter. Also, in other embodiments, the disconnecting devices 3 and 5 can be overrunning clutches or of the magnetic type.

Other disconnecting devices, capable of mechanically disconnect mechanically driven parts, like the load 6 or the gas turbine 2, can be applied.

The load 6 of the present embodiment is a pump, although, as said above, different loads, like a compressor, can be applied.

The drive system 1 operates as follows.

As mentioned above, the drive system 1 can operate according to different modes, and in particular, as better explained below, four modes are available: helper mode, generator mode, full electric mode, and full power generation mode.

Figure 2:
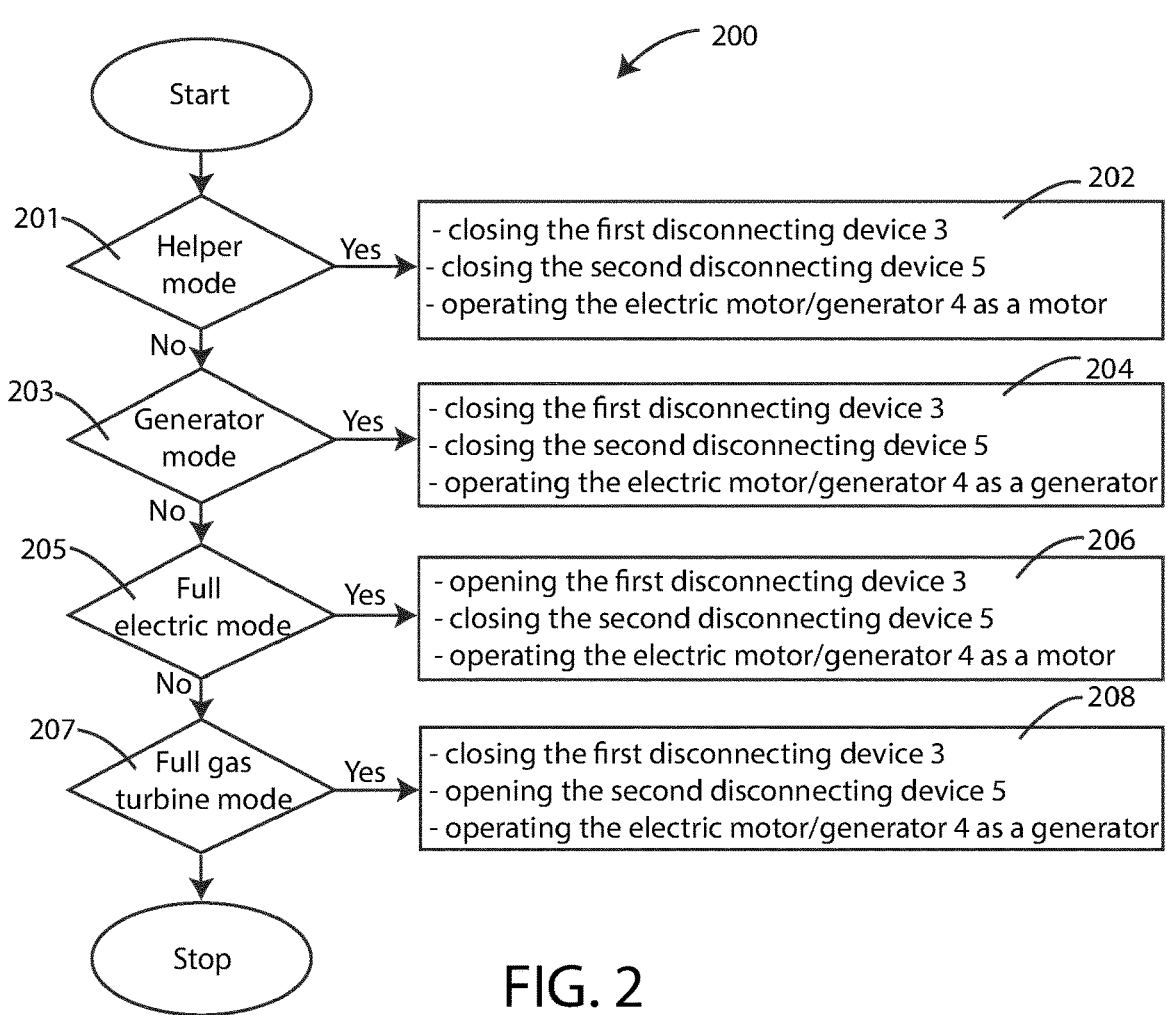
FIG. 2 illustrates a flowchart of the method for operating the drive system according to the present disclosure.

In particular, continuing referring to FIG. 1 as well as also referring to FIG. 2, there is illustrated the method 200, showing the several configurations or operating steps the drive system 1 used in mechanical drive applications can assume.

More specifically, when the mechanical drive system 1 operates in helper mode 201, it is seen that (see step 202) the first disconnecting device 3 is closed, the second disconnecting device 5 is closed and the VFD electric motor 4 operates as a motor. In this case, therefore, the load 6 receives energy both from the gas turbine 2 as well as from the electrical power grid N.

When the mechanical drive system 1 operates in the generator mode 23, the configuration of the drive system 1 is such that (see step 204) the first disconnecting device 3 is closed, the second disconnecting device 5 is closed, and the electric motor/generator operates as a generator. In this configuration, part of the power generated by the gas turbine 2 is delivered to the load 6, and part is delivered to the electric power grid N.

In full electric mode, referring to step 205 of the operating method 200 of FIG. 2, the first disconnecting device 3 is open, the second disconnecting devices 5 is closed, and the VFD electric motor 4 operates as a motor. In this case, as usual, the gas turbine 2 is disconnected from the mechanical drive system 1, and the load 6 is powered by the VFD electric motor 4 by the power derived from the electric powered grid N (see step 206).

Finally, when the mechanical drive system 1 operates in full power generation mode (full gas turbine mode), then (step 208) the first disconnecting device 3 is closed, the second disconnecting device 5 is opened, and the VFD electric motor 4 operates as a generator.

This configuration is used when the electric power grid N requires maximum power, e.g., for a peak of energy is required. In this case, while the second disconnecting device 5 disconnected or opened and the first disconnecting device 3 is closed or connected, the gas turbine 2 can transfer the full power to the VFD electric motor 4, which operates as generator, transferring the power produced by the gas turbine 2 to the electric power grid N. No losses are caused by the connection of the drive system 1 to the load 6, which is actually excluded by the (disconnected) second disconnecting device 5.

In this configuration, in fact, the load, namely the pump 6, is mechanically separated from the VFD electric motor 4 since the second disconnecting device 5 is open.

As it can be appreciated, the two disconnecting devices or clutches, respectively indicated with the reference numbers 3 and 5, offer a full flexibility in the load 6 selection/connection. In fact, when the mechanically drive function is required, the self-synchronizing clutch type will engage, as the drive shaft turns, instead it will not engage because the lock out device on the clutch is energized. This particular condition allows to run the gas turbine 2 in pure generation mode without any mechanical loss, due to the mechanical driven load 6 or equipment in general (pump, compressor . . . ).

The same concept is applicable to the first disconnecting device 3 in order to run the pump 6 in complete electric mode.

As said, in order to disengage the second disconnecting device 5, when the gas turbine 2 is at zero speed, in order to be sure about the disengagement without any actuators, the electric machine, namely the VFD electric motor 4, will be energized for a counter-rotation, about a half or 1-2 turns. As an alternative, in other embodiments, the turning gear device 61 operates the counter-rotation for achieving the disengagement of the second disconnecting device 5.

While the invention has been described in terms of various specific embodiments, it will be apparent to those of ordinary skill in the art that many modifications, changes, and omissions are possible without departing form the spirt and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A drive system for driving a load, comprising:
a gas turbine configured to generate power;
a first shaft coupled to the gas turbine;
a variable frequency drive electric motor coupled to the first shaft and connectable to an electric power grid, the variable frequency drive electric motor configured to operate as a motor to absorb power from the electric power grid and as a generator to inject power into the electric power grid;
a first clutch connected to the first shaft between the gas turbine and the variable frequency drive electric motor;
a second shaft coupled on a first end to the variable frequency drive electric motor;
a load disposed on a second end of the second shaft, the load comprising a turning gear device coupled to the second shaft;
a second clutch connected to the second shaft between the load and the variable frequency drive electric motor,
wherein the turning gear device is spaced apart from the second clutch,
wherein, with the gas turbine at zero speed, the turning gear device counter-rotates the second shaft to disengage the second clutch from the second shaft
to configure said drive system to respond to peak demand on the electric power grid by entering a full power mode that disconnects the load from both the gas turbine and the variable frequency drive electric motor and allows the gas turbine to transfer all power to the variable frequency drive electric motor.

2. The drive system according of claim 1, wherein the first clutch comprises a self-synchronizing clutch.

3. The drive system of claim 1, wherein the second clutch comprises a self-synchronizing clutch.

4. The drive system of claim 1, wherein the first clutch and the second clutch are configured to be operated manually by an operator.

5. The drive system according to claim 1, wherein each of the first clutch and the second clutch are made of two mechanical parts.

6. The drive system of claim 1, wherein the gas turbine comprises:

a gas generator comprising a gas-generator compressor, a high-pressure turbine, and a combustor;

a power turbine; and a coupling shaft connecting the power turbine to the first clutch.

7. The drive system of claim 1, wherein the gas turbine comprises a heavy duty gas turbine.

8. The drive system of claim 1, wherein the first clutch and the second clutch are configured to be operated automatically by an actuator.

9. The drive system according to claim 1, wherein the first clutch and the second clutch are made of two mechanical parts, and wherein the variable frequency drive electric motor is configured to counter rotate one part with respect to the other part of the first clutch and the second clutch to ensure the mechanical disengagement of the mechanical parts.

10. The drive system of claim 1, wherein the gas turbine comprises an aero derivative gas turbine.

11. The drive system according of claim 1, wherein the first clutch comprises an overrunning clutch.

12. The drive system of claim 1, wherein the second clutch comprises an overrunning clutch.

13. A method for operating the drive system of claim 1, comprising the steps of:

closing the second clutch;

operating the variable frequency drive electric motor as a motor to operate said drive system as helper, wherein the load receives energy both from the gas turbine and the electrical power grid.

14. The method of claim 13, comprising the steps of:

closing the first clutch;

operating the variable frequency drive electric motor as a generator to operate said drive system as generator mode, wherein power generated by the gas turbine is delivered to the load and to the electric power grid.

15. The method of claim 13, comprising the steps of:

opening the first clutch;

operating the variable frequency drive electric motor as a motor to operate the drive system as full electric mode, wherein the gas turbine is disconnected from the mechanical drive system and the load is powered by the variable frequency drive electric motor by the powered derived from the electric powered grid.

16. The method of claim 13, wherein each of the first clutch and the second clutch are made of two mechanical parts, and wherein the variable frequency drive electric motor counter-rotates one part with respect to the other part of each first clutch and the second clutch to ensure the mechanical disengagement of the mechanical parts.

* * * * *